United States Patent [19]

Schönbächler et al.

[11] Patent Number: 4,672,100
[45] Date of Patent: Jun. 9, 1987

[54] CHEMICALLY HARDENING TWO-COMPONENT MATERIALS BASED ON POLYURETHANES, METHOD OF PRODUCTION AND USE

[75] Inventors: Max Schönbächler, Wollerau; Wolfgang Saur, Männedorf, both of Switzerland

[73] Assignee: Gurit-Essex AG, Freienbach, Switzerland

[21] Appl. No.: 681,494

[22] Filed: Dec. 13, 1984

[30] Foreign Application Priority Data

Feb. 27, 1984 [DE] Fed. Rep. of Germany ....... 3407031

[51] Int. Cl.$^4$ .................. C08G 18/44; C08G 18/48; C08G 18/42; C08G 18/62
[52] U.S. Cl. ....................... 528/75; 525/458; 528/59; 528/60; 528/44
[58] Field of Search ............... 528/59, 60, 44, 75; 525/458

[56] References Cited

U.S. PATENT DOCUMENTS

| 2,929,800 | 3/1960 | Hill | 528/64 |
|---|---|---|---|
| 3,012,987 | 12/1961 | Ansul | 528/60 |
| 3,054,755 | 9/1962 | Windemuth et al. | 521/155 |
| 3,114,734 | 12/1963 | Gobran et al. | 528/59 |
| 3,228,914 | 1/1966 | Saint-Frison et al. | 528/59 |
| 3,483,167 | 12/1969 | Sommer et al. | 528/59 |
| 3,503,934 | 3/1970 | Chilvers | 528/59 |
| 3,534,000 | 10/1970 | Blanc et al. | 528/59 |
| 3,635,907 | 1/1972 | Schulze et al. | 528/59 |
| 3,652,506 | 3/1972 | Gibier-Ramband et al. | 528/59 |
| 3,652,508 | 3/1972 | Segur | 528/59 |
| 3,663,513 | 5/1972 | Kazama et al. | 528/59 |
| 3,707,521 | 12/1972 | DeSantis | 524/506 |
| 3,723,394 | 3/1973 | Gibier-Ramband et al. | 528/59 |
| 3,733,310 | 5/1973 | Aiken | 528/59 |
| 3,933,725 | 1/1976 | Dearlove et al. | 524/875 |

FOREIGN PATENT DOCUMENTS 3019356 11/1981 Fed. Rep. of Germany.

Primary Examiner—Herbert S. Cockeram
Attorney, Agent, or Firm—Tarolli, Sundheim & Covell

[57] ABSTRACT

A chemically-hardening two-component material based on polyurethane is provided, having a first component being a prepolymer with isocyanate end groups and a second component being a product which has been obtained from that prepolymer with isocyanate end groups by reacting it with a reactive compound which has at least two active groups, containing active hydrogen and which do not react identically with isocyanate. The prepolymer is a reaction product of an aliphatic or aromatic di-isocyanate with a polyol.

Such a material can be produced by reacting a prepolymer which contains isocyanate end groups, with a second component, which, in turn, has resulted from a prepolymer with isocyanate end groups by reacting with a reactive compound which has at least two molecule groups, containing hydrogen and reacting differently with isocyanate. The material is especially suitable as a self-hardening gluing, coating, sealing and molding material.

31 Claims, No Drawings

CHEMICALLY HARDENING TWO-COMPONENT MATERIALS BASED ON POLYURETHANES, METHOD OF PRODUCTION AND USE

FIELD OF THE INVENTION

This invention relates to chemically-hardening two-component materials which consist mainly of polyurethanes. This invention also relates to the production and use of these materials.

BACKGROUND OF THE INVENTION

Hardenable polyurethanes are well known in the literature. U.S. Pat. No. 3,933,725, for example, describes the production of hardenable oligourethanes by the reaction of diphenylmethane di-isocyanates with polyoxypropylene diols and polyoxypropylene triols in a one-step process.

U.S. Pat. No. 3,707,521 describes the production of oligourethanes by the reaction of excess amounts of di-isocyanates with polyoxyalkylene groups still intact. These are reacted in a second step with diols to obtain products having isocyanate polyalkylene triols, forming a branched polyurethane, which still contains free isocyanate groups.

Products obtained according to the methods disclosed in these patents, or in similar ways, have the disadvantage that they harden with splitting of $CO_2$. The hardening of moisture-reactive oligourethanes $R-N=C=O$ may be illustrated approximately by the following reaction scheme:

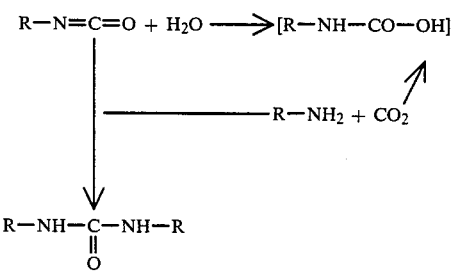

Moisture hardening can lead to undesired bubble formation, while the hardening speed depends greatly on the humidity present in the air and is therefore difficult to control. The hardening takes place very slowly from the outermost layers inward, and not simultaneously in the whole mass, as in two-component products.

In the published German Patent Application No. 30 19 356 there is described the hardening of oligourethanes, containing isocyanate groups, with latent hardeners, for example, aldimines and oxaxolidines. Dienamines are also recommended as latent hardeners. Under these conditions, the rate of hardening, despite addition of the latent hardeners, still depends on the supply of moisture from the surroundings and the diffusion rate. Here also, the hardening takes place gradually from the outside to the inside and requires rather long times, expecially with thick layers.

Recommended blocking agents for isocyanate functions in polyurethanes are methylol ether, malonic acid ester, caprolactam, phenols and ketoximes. (See, in this regard, the published German Patent Application Nos. 29 46 085; 25 42 500; 25 50 156; and 29 29 224.) Hardening with blocking agents, however, has the disadvantage of requiring higher temperatures, at which volatile splitting products sometimes result, which can lead to bubble formation.

U.S. Pat. No. 3,054,755 describes a polyrurethane which results by reaction of a polyisocyanate with a polyalkylene glycol (poly-alkylene ether glycol) and subsequently with an amino alcohol. U.S. Pat. No. 3,228,914 describes the reaction of a prepolymer containing isocyanate groups with an amino alcohol. This material is finally hardened by addition of an aromatic di-isocyanate monomer at a raised temperature and under pressure. U.S. Pat. No. 3,114,734 describes compound which result by reaction of amino mercaptans and dimercaptans with terminal isocyanate groups of polyurethane resins. This material is vulcanized by oxidation of the mercapto groups.

The above-described two-component systems have the disadvantage that their components must generally be used in exact stoichiometric mixing proportions; otherwise, products result with greatly diiffering, often unsatisfactory physical properties, and the degree of hardening is left to chance. In cases where no stoichiometric mixing proportion is required it is generally a matter of low-molecular crosslinking agents. Here the hardening generally takes place so rapidly that handling is extremely difficult. Also, products result which often do not have the desired physical properties.

SUMMARY OF THE INVENTION

It has been found that mixtures of (i) a prepolymer, having free isocyanate functional groups, which has been obtained from a di-isocyanates monomer or polyisocyanate, with (ii) a second component formed from a prepolymer with isocyanate end groups by reaction with a mercapto alcohol, an amino alcohol, a hydroxy-, thio or amino-carboxylic acid, have surprisingly advantageous properties for gluing, coating, sealing and molding materials.

The advantageous properties of theses materials are not associated with tightly fixed mixing proportions of the components. They are easy and practical to handle and process. In particular, they harden quickly and completely, thus, in the depth also, without having to be overly heated, or without gas formation occuring.

An object of the present invention is to provide a two-component material in which the usual single-component oligourethanes, with free isocyanate groups, are processed by mixing in a second component, by which the following improvements are sought, as compared with the prior art materials.

The two components should be mixable with each other in widely variable proportions, without a loss of quality.

In the hardened condition, the product should be uniformly homogeneous and stable.

A much more rapid and complete hardening should be reached than with moisture-reactive oligourethanes.

Bubble formation through the development of $CO_2$ or other volatile reaction components should be generally prevented. Handling should be greatly simplified.

It is also an object of the present invention to provide simple coating, sealing or gluing materials which, after rapid hardening, have ideal physical properties, especially improved resilience, improved breaking load, breaking stretch, tear resistance and uniform hardness.

DESCRIPTION OF PREFERRED EMBODIMENTS

The following simplified diagram of one example will serve as illustration.

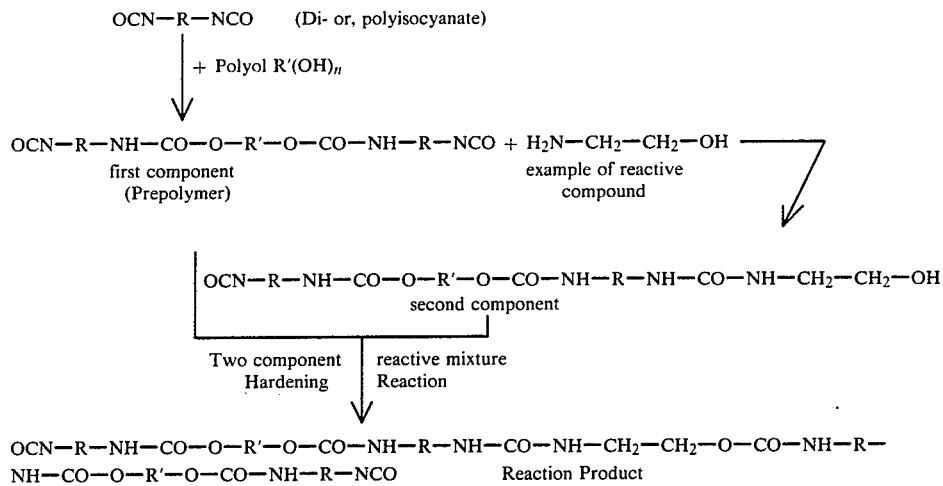

The subject of the invention, therefore, is a chemically hardening two-component reactive mixture based on polyurethanes, which includes as its first component a prepolymer with isocyanate end groups and as its second component a reaction product of a prepolymer having isocyanate end groups with a reactive compound which has at least two molecular groups containing hydrogen, and reacting differently with isocyanate.

Such a two-component material is distinguished by the fact that the prepolymers of the first and the second component are a reaction product of at least one aliphatic or aromatic di-isocyanate monomer or polyisocyanate with less than the equivalent amount of at least one polyol, which is chosen from the group which includes polyether, polythioether, polyester, polycaprolactone, polycaprolactam, polycarboxylate, polyacrylate, polymethacrylate, polyurethane and hydrocarbon polymers, with at least two hydroxyl functions in the molecule in each case.

As the di-isocyanate monomers or polyisocyanates for production of the prepolymer, there may be used the following isocyanates or mixtures of these isocyanates: toluylene di-isocyanates, diphenylmethane di-isocyanates, 4,4'-diphenyl di-isocyanate, 4,4'-di-isocyanate-3,3'-dichlor-diphenyl, 4,4'-di-isocyanato-3,3'-dimethoxydiphenyl, 4,4'-di-isocyanate-3,3'-diphenyl-diphenyl, 4,4'-di-isocyanato-3,3'-dimethyl-diphenylmethane, 1,5-naphthylene-di-isocyanate, N,N'-(4,4'-dimethyl-3,3'-di-isocyanato-diphenyl)-uretdion, n-xylylene-di-isocyanate, 2,4,4'-triisocyanato-diphenyl ether, 4,4',4"-triphenyl methane-triisocyanate, tris-(4-isocyanatophenyl)-thiophosphate, 1,6-hexamethylene di-isocyanate, trimethylhexamethylene di-isocyanate, 3-isocyanatomethyl-3,5,5-trimethyl cyclohexyl isocyanate, (isophorodiisocyanate), trans-1,4-cyclohexane di-isocyanate, p-phenylene di-isocyanate, tetramethyl-xylylene di-isocyanate, 4,4'-dicyclohexyl methane di-isocyanate, 2,2-bis-(4-(6-isocyanato-hexanolyloxy)-phenyl)propane, polymethylene-polyphenyl isocyanate, polyfunctional aromatic isocyanate reaction products of 2,4-toluene diisocyanate and trimethylolpropane, mol ratio 3:1, and, of hexamethylene diisocyanate and water, mol ratio 3:1 isocyanurate and a mixture of these isocyanates.

As polyols for the production of the prepolymer there may be used polyethers, which are produced, for example, by polymerization of epoxides, such as ethylene oxide, propylene oxide, butylene oxide, tetrahydrofuran, styryl oxide or epichlorohydrin, alone or by depositing these epoxides, expecially propylene oxide, on starting components, with reactive hydrogen atoms, such as water, alcohols, amines, for example, ethylene glycol, propane diol-1,2 and -1,3, butane diol-1,2 and -1,4, hexane diol-1,6, trimethylpropane, hexane triol, glycerine, triethanol amine, sorbite, mannite, sucrose, ammonia, ethanol amine or hexamethylene diamine. These have an average molecular weight of more than 1,000, usually from 2,500 to 7,000, and an OH functionality of at least 2, usually 2.2 to 4.

Suitable polyesters include for example, the reaction products of polyvalent (usually bivalent or trivalent) alcohols with polyvalent (usually bivalent) carboxylic acids or carboxylic acid anhydrides or carboxylic acid esters with low alcohols. The carboxylic acids may include succinic acid, adipic acid, suberic acid, azelaic acid, sebacic acid, phthalic acid, isophthalic acid, trimellitic acid, phthalic acid anhydride, tetrahydrophthalic acid anhydride, tetrachlorophothalic acid anhydride, glutaric acid anhydride, maleic acid anhydride, fumaric acid, teraphtalic acid dimthyl ester and terephthalic acid-bis-glycol ester. Polyvalent alcohols may include ethylene glycol, propylene glycol-1,2 and -1,3, butylene glycol-1,4 and -2,3, hexane diol-1,6, octane diol-1,8, glycerine, trimethylol propane, pentaerythrite, quinite, mannite and sorbite, and methyl glycoside, as well as diethylene glycol, polyethylene glycol, dipropylene glycol, and polypropylene glycol.

Among the polycaprolactams are for, example, the products obtained from caprolactam and di- and polyalcohols.

Polyacrylates and polymethacrylates are prepared by the polymerization of compounds of the general formula:

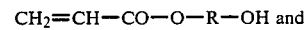

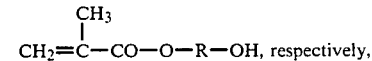

wherein R is a lower alkylene radical with 2 to 6 carbon atoms. Polyacrylates and polymethacrylates may also be prepared by the copolymerization of these compounds with other polymerizable ethylene-saturated compounds with 2 to 10 carbon atoms in the molecule, (for example, styrol, acrylic acid, fumeratine, propylene, vinyl chloride and butadiene).

Polycarbonates having hydroxyl groups may include those which can be produced by the reaction of diols, such as propane diol-(1,3), butane diol-(1,4) and/or hexane diol-(1,6), diethylene glycol, triethylene glycol, teraethylene glycol with diaryl carbonates, for example, with diphenyl carbonate or phosgene.

Hydroxy group-containing polyurethanes which can be used as polyols, have a molecular weight of 2,000 to 10,000, usually 4,000 to 8,000. Because of their high viscosity, they must be reacted in so-called softener oils, which as a rule, are phthalates. For this purpose there may be considered, for example, dibutyl, dioctyl, diisodecyl, dibenzyl or butyl benzyl phthalates.

In some cases it may be well to accelerate the reaction by the addition of catalysts, such as tin salts of carboxylic acid, for example. For this purpose one may use tin acetate, tin octate, tin laureate, tin oleate or di-alkyl-tin-dicarboxylates such as dibutyl tin diacetate or dibutyl tin dilaureate, etc., as well as tin mercaptides or tertiary amines.

In one example of execution of the two-component material, the prepolymer of the reaction product of the second component may be produced from starting materials of the same chemical composition as the prepolymer contained in the first component. The prepolymer of a reaction product of the second component may have 0.5 to 1.5 (preferably 0.8 to 1.2) times the NCO content of the prepolymer contained in the first component.

Generally, there is used as the first component a prepolymer which is used also for the production of the second component, because this is simpler; the products have a more uniform composition and the two components can be reacted with each other in a wider proportion without their properties being changed.

To attain certain effects, for example, a greater cross-linking in the one component, the prepolymer for one component may be made from a polyisocyanate, for example, and the prepolymer for the other component from a di-isocyanate. The choice of different polyols for the production of the prepolymers affords similar possibilities of differentiation. The second component consists of a reaction product of a prepolymer with a reaction compound which contains, as reactive molecular groups, hydrogen, hydroxy, mercapto, amino and/or carboxyl groups.

Such a reactive compound may contain 2 to 6 (preferably 2 to 3, and especially 2) reactive molecule groups containing hydrogen. Such substances are, for example, mercapto alcohols, amino alcohols, hydroxy-, thio- or amino-carboxylic acids. Examples of such substances include mercapto ethanol, mercapto propane diol, dimercapto propanol, amino ethanol, amino propanol, amino propane diol, N-methylamino ethanol, N-methyl amino propane diol, N-methyl glucamine, amino phenol, hydroxyethyl piperazine, glycolic acid, lactic acid, thioglycolic acid, thiolactic acid, amino acetic acid or lysine.

In the reaction of the prepolymer for the second component, absolute care must be taken to ensure that the reaction product formed has free molecular groups, containing hydrogen, which are reactive with isocyanate. This result is obtained, in accordance with the present invention, by the fact that the reactive compound used for the reaction has at least two different reactive molecular groups reacting wiht isocyanate groups.

In accordance with the present invention, the process for the production of a hardenable two-component material, based on polyurethane, consists in that the prepolymers of the first and the second component are produced by reaction of at least one aliphatic or aromatic di-isocyanate monomer or poly-isocyanate with less than the equivalent amount of at least one polyol, which latter is chosen from the group including polyether, polythio-ether, polyester, polycaprolactone, polycaprolactam, polycarboxylate, polyacrylate, polymethacrylate, polyurethane and hydrocarbon polymers, with at least two hydroxyl functions in the molecule, in each case.

Specific amount proportions, in the three reactions necessary to practice the invention, may be given as follows:

(1) In the reaction of di- and poly-isocyanate with polyols to the prepolymers, the mixing proportions are chosen so that free isocyanate end groups still remain; they are used either for the final step or for the preparation of the second component. The equivalent proportion of isocyanate to hydroxy functions amounts to about 1.3 to 3:1. The equivalent proportion 1.5:1 to 2.2:1 has proved especially suitable.

(2) For the reaction of the prepolymer to the second component, usually per equivalent of the isocyanate function present, 0.8 to 1.2 moles of the reaction compound are used, which, by definition, has at least two reaction groups in the molecule. This ensures that the reaction product, that is, the second component, has reactive groups which can react with the isocyanate groups of the first component, whereby the final product can finish the reaction.

(3) The mixing proportion for the final step (that is, for the mixing of the two components) is not critical. It may vary from 0.8:1 to 5:1. Usually mixtures in the equivalent ratio NCO:H(active) of 1:1 to 5:1, preferably 1.2:1 to 2:1, are used. With this, generally, provision is made that the mixture, even with variations in the mixing proportion, will react with any air moisture still present to the final condition.

GENERAL REACTION CONDITIONS

The reactions for production of the two components are carried out at a temperature of from 20° to 130° C., preferably in the range of from 40° to 80° C., while agitating and generally under a protective gas, such as nitrogen for example. As mentioned before, reaction in solvents is possible and may even be necessary if the reaction components are not fluid enough. In many cases, however, a solvent is not needed. The use of catalysts to accelerate the isocyanate reaction is also possible, as mentioned above, and is also desirable in the case of reacting relatively high-molecular components. By the addition or omission of catalysts, the keeping quality of the components and the hardening time can be influenced.

The two-component materials produced in accordance with the present invention may be used for gluing, coating, sealing and molding materials, in building construction, and vehicle, aircraft and ship building. As gluing materials, they may be used, for example, for sealing and gluing panes of insulating glass in buildings or panes of glass in vehicles and aircraft. They are widely usable as coating and sealing materials for the production of thick-layer coatings, especially for the sealing of concrete structures, for roof coatings, for floor coverings, as carpet, as carpet underlays, and in general, as coverings resistant to abrasion and slipping, and as protection against stone blows, in vehicle, aircraft and shipbuilding. As molding materials or molding resins they may be used for the production of molded masses and pouring masses, for example, in the electrical sector, and for molded parts of all kinds.

Generally, these two-component materials are not used in their pure form. Rather, they are used together with oter aids and additives, such as plasticizers, solvents, filling and extending agents, thickeners, anti-aging agents and other special additives to get better properties. For example, silanes may be used to improve adhesion properties. Also, by the use of primers or base coats, known per se, for example, based on silanes and-/or isocyanates, a very good adhesion may be obtained on various materials.

For fireproofing equipment, flame-inhibiting additives, such as aluminum oxide hydrate, antimony trioxide or additives containing halogen, such as PVC powder, may be incorporated. To increase electric conductivity, graphite or metal powder, for example, may be added to the materials. The addition of rubber meal or rubber granulate, to make cheaper and to improve the abrasion properties, is also possible.

The invention also contemplates, therefore, the use of mixtures of a prepolymer, containing isocyanate end groups, and a second component which has resulted from a prepolymer with isocyanate end groups by reaction with a reactive compound, which contains at least two molecular groups, containing hydrogen, and reacting differently with isocyanate, as self-hardening gluing, coating and sealing materials.

In particular, the invention contemplates the use as self-hardening gluing, coating, sealing and molding materials of mixtures of the prepolymer containing isocyanate end groups, which has resulted from a monomer di- or poly-isocyanate by reaction with a polyol, with a second component, which, in turn, has been obtained from a prepolymer, possibly the same or similar, by reaction with a mercapto alcohol, an amino alcohol, a hydroxy-, thio- or amino-carboxylic acid.

The important advantages of the two-component materials according to the invention are:

(1) Since, with an excess of the first component, the excess NCO groups are hardened through air moisture, the mixing proportion of the two components can vary within wide limits (0.8:1 to 5:1) without greatly changing the properties of the product obtained. For the manufacturing of two-component materials, which is generally not in the hands of chemically trained personnel, this greatly facilitates products always of the same quality, under simple and even primitive working conditions. Contrary to this, with the known prior art two-component systems, the proportion of mixing must be quite exactly maintained, to obtain products with the necessary properties. Variations from the prescribed mixing proportion of the known prior art systems, by as little as 10-15%, may result in a considerable loss of quality.

(2) With use of the first and second components in the preferred mixing proportion, from about 1:1 to 2:1 or more, a product is obtained, which, without the coaction of air moisture, reticulates quickly and completely and also reacts (completely) as quickly in the depth as at the surface. This is a great advantage over the known moisture-reactive oligourethane materials containing isocyanates radical groups, which are reticulated (crosslinked) and harden inwards from the surface under the action of moisture in the air, while $CO_2$ is set free, which leads to porous materials containing gas bubbles. The reticulation and hardening in the deeper layers of the material may require months.

EXAMPLE 1

A. First Component (Prepolymer)

4,500 grams of a polyether diol with an average molecular weight of 2,000 are treated with 1,250 grams 4,4'-diphenyl methane di-isocyanate, and allowed to react under nitrogen at 70° C., with agitation. Next, 2,900 grams of dioctyl phthalate are added and the material is allowed to react further at 70° C. Next, 2,200 grams of polyether triol, with an average molecular weight of 4,500, and 12 grams dibutyl tin dilaureate, are added. After the exothermic reaction is ended, in which the temperature must not exceed 110° C., a prepolymer results, with an isocyanate content of 1.6%.

B. Second Component 5,800 grams of the prepolymer obtained according to Example 1-A above, are treated with 166 grams 2-mercapto ethanol, and stirred at 40° C. until the infrared (IR) spectrum no longer shows any isocyanate groups. A clear yellowish fluid is obtained with a viscosity of about 140 Pa.s at 23° C.

C. Elastic Coating Material 100.grams of the first component are mixed with 100 grams of the second component and poured onto a glass plate so that a layer about 2 mm thick results. After about 8 hours, the material is reticulated and can be pulled off from the plate. The elastomer so obtained has a good elasticity and tensile strength.

EXAMPLE 2

Proceeding as in Example 1-C, but with only 75 grams instead of 100 grams of the second component, there results after 8 hours a similar elastomer which only reaches its full elasticity and tensile strength after storage for about 16 hours.

EXAMPLE 3

A result similar to that described in Example 2 is obtained when only 50 grams of the second component are used.

EXAMPLE 4

A. 7,000 grams of the first component (prepolymer), prepared according to Example 1-A, are homogeneously mixed with 1,000 grams lampblack and 2,000 grams kaolin in a planetary mixer under vacuum. Then 60 grams of a dibutyl tin dilaurate solution are added and mixed in homogenously under vacuum. A tough viscous, nonfluid material is obtained, which is poured into cartridges.

B. 7,000 grams of the second components, prepared according to Example 1-B, are homogeneously mixed in the same way with lampblack, kaolin and catalyst, and poured out.

C. 100 grams of the material prepared according to Example 4-A are mixed with 50 grams of the material prepared according to Example 4-B. Within a few hours, a pull-resistant sealing material is obtained, the properties of which are listed in Table 1 as follows:

TABLE

|  | Example 4 | Example 5 | Example 6 |
|---|---|---|---|
| Processing time | ca. 15 min. | ca. 15 min. | ca. 15 min. |
| Free of stickiness after | 2 hrs | 1.5 hrs | 1 hr |
| Tensile strength |  |  |  |
| after 1 hr | 0.5 N/mm$^2$ | 0.8 N/mm$^2$ | 1 N/mm$^2$ |
| after 12 hrs | 3.5 N/mm$^2$ | 3.5 N/mm$^2$ | 3.5 N/mm$^2$ |

From Table 1 it can be seen that by varying the mixing proportion of the two components, the properties are only relatively little changed.

EXAMPLE 5

If, as in Example 4, 100 grams of the component produced in Example 4-A are mixed with 70 grams of 4-B, a sealing mixture with similar properties is obtained.

EXAMPLE 6

If as in Example 4, 100 grams of the component produced in Example 4-A are mixed with 100 grams of 4-B, a sealing material is obtained which has similar properties, but which recticulates somewhat more rapidly than the materials according to Examples 4 and 5.

EXAMPLES 7 TO 9

A. Production of the Second Component

This takes place in a manner similar to that of Example 1-B, the 2-mercapto ethanol being replaced by 161 grams of monomethyl ethanol amine.

B. Production of the Sealing Materials

This takes place, in a manner similar to Example 4, with, in each case, 100 grams of the first component and 50, 75 and 100 grams of the second component, with omission of the catalyst used in Example 4.

The properties of the products obtained are shown in Table 2 which follows:

TABLE 2

|  | Example 7 | Example 8 | Example 9 |
|---|---|---|---|
| 1st component | 100 g | 100 g | 100 g |
| 2nd component | 50 g | 70 g | 100 g |
| Processing time | ca. 3 min. | ca. 3 min. | ca. 3 min. |
| Free of stickiness time | 20 min. | 20 min. | 20 min. |
| Tensile strength |  |  |  |
| after 1 hr | 2.0 N/mm$^2$ | 2.0 N/mm$^2$ | 2.0 N/mm$^2$ |
| after 4 hrs | 3.5 N/mm$^2$ | 3.5 N/mm$^2$ | 3.5 N/mm$^2$ |

EXAMPLES 10 TO 12

A. Production of the Second Component

This takes place in a manner similar to Example 1-B, but instead of 2-mercapto ethanol, 275 grams N-2(2-hydroxyethyl)-piperazine are used.

B. Production of the Coating Material

In each case, 100 grams of the first component of Example 1-A are mixed with 100, 70 and 50 grams of the second component, prepared according to the above direction A, with N-(2-hydroxyethyl)-piperazine. The mixture is poured out on glass plates so that a layer about 2 mm thick results.

After only two hours, the materials are so greatly reticulated that the film can be pulled from the glass plates. After 4 hours more of storage at room temperature, the films have very good elasticity and tensile strength.

EXAMPLES 13 TO 37

As described in Example 1, sealing materials can be produced when the 4,4'-diphenyl methane diisocyanate is replaced by the equivalent amount of:
13. toluylene di-isocyanate
14. diphenyl methane di-isocyanate isomer mixture
15. 4,4'-diphenyl di-isocyanate
16. 4,4'-diisocyanato-3,3'-dichlore diphenyl
17. 4,4'-diisocyanato-3,3'-dimethoxy diphenyl
18. 4,4'-diisocyanato-3,3'-diphenyl diphenyl
19. 4,4'-diisocyanato-3,3'-dimethyl diphenyl methane
20. 1,5-naphthylene-di-isocyanate
21. N,N'-(4,4'-dimethyl-3,3'diisocyanato diphenyl)-uretdion
22. m-xylylene di-isocyanate
23. 2,4,4'-triisocyanato-diphenyl ether
24. 4,4',4''-triphenyl methane triisocyanate
25. tris-(4-isocyanatophenyl)-thiophosphate
26. 1,6 hexamethylene di-isocyanate
27. trimethyl hexamethylene di-isocyanate
28. 3-isocyanatomethyl-3,5,5-trimethyl cyclohexyl isocyanate (isophoron di-isocyanate)
29. trans-1,4-cyclohexane di-isocyanate
30. p-phenylene di-isocyanate
31. tetramethyl-cyclylene di-isocyanate
32. 4,4'-dicyclohexyl methane di-isocyanate
33. 2,2-bis (4-(6-isocyanato-hexanoyl-oxy)-phenyl)-propane
34. polymethylene polyphenyl isocyanate
35. polyfunctional aromatic isocyanate reaction product of 2,4-toluene diisocyanate and trimethylolpropane, mol ratio 3:1
36. polyfunctional aromatic isocyanate reaction product of hexamethylene diisocyanate and water, mol ratio 3:1
37. Isocyanurate

EXAMPLES 38 TO 50

As described in Examples 1 and 4, gluing, coating, sealing and molding materials may be prepared, by substituting for the 2 mercapto ethanol mentioned in Example 1 -B, the equivalent amount of:
38. dimercapto propanol
39. mercaptopropane diol
40. amino ethanol
41. amino propane diol
42. N-methyl amino ethanol
43. N-methyl glucamine
44. amino phenol
45. glycolic acid
46. lactic acid
47. thioglycolic acid
48. thiolactic acid
49. amino acetic acid
50. lysine.

EXAMPLE 51

A. Production of Prepolymer 2,000 grams of a polyurethane, containing hydroxyl groups, with an average molecular weight of 5,000 and an OH number of 28, are mixed with 2,700 grams dibutyl phthalate and 10 grams dibutyl tin diacetate. Now, 350 grams of 4,4'-diphenyl methane di-isocyanate are added. The material is allowed to react, with agitation, at 70° C. After the end of the reaction, a prepolymer is obtained with an isocyanate content of 1.5%.

B. Production of the Second Component 6,200 grams of the prepolymer obtained according to Example 51-A are treated with 166 grams monomethyl ethanol amine and stirred at 40° C. until the infrared spectrum no longer shows any isocyanate groups.

C. Molding Material 100 grams of the first component (a prepolymer produced from polyether di- and triols), prepared according to Example 1-A, are mixed with 100 grams of the second component prepared according to Example 51, whereby a molding material is obtained suitable for the production of molding and pouring materials.

What is claimed is:

1. A chemically hardening two-component material, based on a reactive mixture of polyurethanes, comprising (i) a first component which is a prepolymer with isocyanate end groups and (ii) a second component which is a reaction product of said or another prepolymer with isocyanate end groups and a compound containing at least two active hydrogens said compound selected from the group consisting of a mercapto alcohol, an amino alcohol, a hydroxy-, thio- or amino-carboxylic acid, wherein the prepolymers of the first and the second component are reaction products of at least one aliphatic or aromatic di-isocyanate monomer or polyisocyanate with less than the equivalent amount of at least one polyol, said polyol being selected from the group consisting of polyether, polythioether, polyester, polycaprolactone, polycaprolactam, polycarbonate, polyacrylate, polyurethane and hydrocarbon polymers with at least two hydroxyl functions in the molecule in each case, so that the equivalent ratio NCO:H (active) of the two components is in the range from 0.8:1 to 5:1.

2. A two-component material according to claim 1, wherein the prepolymers of the first and second components have at least approximately the same functionality.

3. A two-component material according to claim 1 or 2, wherein the prepolymers of the first and second components are produced from isocyanates having the same chemical composition.

4. A two-component material according to claim 1 or 2, wherein the prepolymers of the first and second components comprise polyols having the same chemical composition.

5. A two-component material according to claim 1 or 2, wherein the monomeric or poly-isocyanate for the production of the prepolymer is selected from the group consisting of toluylene diisocyanate, diphenylmethane diisocyanate, 4,4'-diphenyl di-isocyanate, 4,4'-diisocyanato-3,3'-dichlor-diphenyl, 4,4'-diisocyanato-3,3'-dimethoxydiphenyl, 4,4'-diisocyanato-3,3'-diphenyl-diphenyl, 4,4'-diisocyanato-3,3'-dimethyl-diphenylmethane, 1,5-naphthylenediisocyanate, N,N'-(4,4'-dimethyl-3,3'-diisocyanatodiphenyl)-uretdion, n-xylylene-di-isocyanate, 2,4,4'-triisocyanato-diphenyl ether, 4,4',4"-triphenyl methanetriisocyanate, tris-(4-isocyanatophenyl)-thiophosphate, 1,6-hexamethylene di-isocyanate, trimethylhexamethylene di-isocyanate, 3-isocyanatomethyl-3,5,5-trimethyl cyclohexyl isocyanate, trans-1,4-cyclohexane di-isocyanate, p-phenylene di-isocyanate, tetramethyl-xylylene di-isocyanate, 4,4'-dicyclohexyl methane di-isocyanate, 2,2-bis(4-(6-isocyanato- hexanolyl-oxy)-phenyl)propane, polymethylene-polyphenyl isocyanate, reaction product of toluene diisocyanate and trimethylolpropane, reaction product of hexamethylene diisocyanate and water and a mixture of these isocyanates.

6. A two-component material according to claim 1 or 2, wherein the prepolymer of the second component has an NCO content about 0.5 to about 1.5, times that contained in the first component.

7. A two-component material according to claim 1, wherein the second component contains the reaction product of a prepolymer with a reactive compound which has as reactive molecule groups containing hydrogen, hydroxy, mercapto, amino and/or carboxyl groups.

8. A two-component material according to claim 1 or 7 wherein the reactive compound contains about 2 to about 6 reactive molecular groups containing hydrogen.

9. A two-component material according to claim 8, wherein the second component contains a reaction product of a prepolymer with a mercapto alcohol, an amino alcohol, or a hydroxy-, thio-, or amino-carboxylic acid.

10. A two-component material according to claim 9, wherein the second component contains a reaction product of a prepolymer with said reactive compound being selected from the group consisting of mercapto ethanol, mercapto propane diol, dimercapto propanol, amino ethanol, amino propanol, amino propane diol, N-methyl amino ethanol, N-methyl glucamine, amino phenol, hydroxyethyl piperazine, glycolic acid, lactic acid, thioglycolic acid, thiolactic acid, aminoacetic acid and lysine.

11. A two component material according to claim 1, wherein the second component has free molecular groups containing hydrogen which are reactive with isocyanate.

12. A two component material according to claim 1, wherein the mixture, after the reaction of the two components with each other, no longer contains any free isocyanate radicals.

13. A two component material according to claim 1, wherein the mixture, after the reaction of the two components with each other, contains free isocyanate radicals and can therefore be crosslinked with water.

14. A two-component material according to claim 1 or 2 wherein the equivalent ratio NCO:H(active) of the two components is in a range of from 0.8:1 to 5:1.

15. A process for producing a hardenable material based on polyurethanes, comprising the steps of:
providing a first component which is a prepolymer with isocyanate end groups;
providing a second component which is a reaction product of a prepolymer with isocyanate end groups and a reactive compound containing at least two active hydrogens said compound selected from the group consisting of a mercapto alcohol, an amino alcohol, a hydroxy-, thio- or amino- carboxylic acid;
said prepolymer being a reaction product of at least one aliphatic or aromatic di-isocyanate monomer or poly-isocyanate with less than the equivalent amount of at least one polyol;
said polyol being selected from the group consisting of polyether, polythioether, polyester, polycaprolactone, polycaprolactam, polycarbonate, polyacrylate, polyurethane and hydrocarbon polymers with at least two hydroxyl functions in the molecule in each case; and reacting said first component with said second component, so that the equivalent ratio NCO:H (active) of the two components is in the range from 0.8:1 to 5:1.

16. A process according to claim 15, wherein the prepolymers of the first and the second components have at least approximately the same functionality.

17. A process according to claim 15 or 16, wherein the prepolymers of the first and the second components comprise isocyanates having the same chemical composition.

18. A process according to claim 15 or 16, wherein the prepolymers of the first and the second components are produced from polyols having the same chemical composition.

19. A process according to claim 16, wherein the monomeric or polyisocyanate used for the production of the prepolymer is selected from the group consisting of toluylene di-isocyanate, diphenylmethane di-isocyanate, 4,4'-diphenyl-di-isocyanate, 4,4'-diisocyanate-3,3'-dichlor-diphenyl, 4,4'-diisocyanato-3,3'-dimethoxy diphenyl, 4,4'-diisocyanato-3,3'diphenyldiphenyl, 4,4'-diisocyanato-3,3'-dimethyl diphenyl methane, 1,5-naphthylene di-isocyanate, N,N'-(4,4'-dimethyl-3,3'-diisocyanato diphenyl)-uretdion, m-xylylene-di-isocyanate, 2,4,4'-triisocyanato-diphenyl ether, 4,4',4''-triphenylmethane triisocyanate, tris-(4-isocyanatophenyl)-thiophosphate, 1,6-hexamethylene di-isocyanate, trimethyl hexamethylene di-isocyanate, 3-isocyanate-methyl-3,5,5-trimethyl cyclohexyl isocyanate, trans-1,4-cyclohexane di-isocyanate, p-phenylene di-isocyanate, tetramethyl-xylylene di-isocyanate, 4,4'-dicyclohexyl methane di-isocyanate, 2,2-bis-(4-(6- isocyanato-hexanoyl-oxy)-phenyl) propane, polymethylene-polyphenylene isocyanate, reaction product of toluene diisocyanate and trimethylolpropane, reaction product of hexamethylene diisocyanate and water and a mixture of these isocyanates.

20. A process according to claim 15, or 16, with the distinction that as starting material for production of the second component, a prepolymer is used which has about 0.5 to 1.5 times the NCO content of the prepolymer of the first component.

21. A process according to claim 15, wherein the second component is obtained by reacting a prepolymer with a reactive compound which contains, as a reactive molecule group containing hydrogen, hydroxy, mercapto, amino and/or carboxyl groups.

22. A process according to claim 21, wherein the reactive compound which is reacted with the prepolymer, contains 2 to 6 reactive molecule groups containing hydrogen.

23. A process according to claim 21, wherein the prepolymer is reacted with a mercapto alcohol, an amino alcohol or with a hydroxy-, thio- or amino-carboxylic acid.

24. A process according to claim 23, wherein the prepolymer is reacted with a reactive compound selected from the group consisting of mercapto-ethanol, mercapto propane diol, dimercapto propanol, amino ethanol, amino propanol, amino propane diol, N-methyl amino-ethanol, N-methyl glucamine, amino phenol, hydroxyethylpiperazine, glycolic acid, lactic acid, thioglycolic acid, thiolactic acid, aminoacetic acid and lysine.

25. A process according to claim 16 or 21 wherein the two components are reacted with each other in an equivalent ratio NCO:H(active) of from about 0.8:1 to about 5:1.

26. A two-component material according to claim 6 wherein the prepolymer of the second component has an NCO content 0.8 to 1.2 times that contained in the first component.

27. A two-component material according to claim 8, wherein the reactive compound contains about 2 to about 3 reactive molecular groups containing hydrogen.

28. A two-component material according to claim 14, wherein said equivalent ratio is in a range of from about 1.2:1 to about 2:1.

29. A process according to claim 20 wherein said prepolymer of said second component has from about 0.8 to about 1.2 times the NCO content of said prepolymer of said first component.

30. A process according to claim 22 wherein the reactive compound contains about 2 to about 3 reactive molecule groups containing hydrogen.

31. A process according to claim 25, wherein said equivalent ratio is from about 1.2:1 to about 2:1.

* * * * *